United States Patent
Suzuki et al.

(10) Patent No.: US 6,942,076 B2
(45) Date of Patent: Sep. 13, 2005

(54) SHOCK ABSORBING STRUCTURE FOR VEHICLE

(75) Inventors: Takane Suzuki, Toyota (JP); Kazuyuki Fukushima, Toyota (JP)

(73) Assignees: Kojima Press Industry Co., Ltd., Toyota (JP); Wakamiya Industry Co., Ltd., Toyota (JP)

(*) Notice: Subject to any disclaimer, the term of this patent is extended or adjusted under 35 U.S.C. 154(b) by 0 days.

(21) Appl. No.: 10/376,809

(22) Filed: Feb. 28, 2003

(65) Prior Publication Data

US 2004/0041319 A1 Mar. 4, 2004

(30) Foreign Application Priority Data

Aug. 28, 2002 (JP) ........................................ 2002-248124

(51) Int. Cl.[7] ........................ B60R 21/04; F16M 1/00; F16M 3/00
(52) U.S. Cl. ............. 188/371; 296/187.02; 296/187.05
(58) Field of Search ...................... 296/187.05, 187.03, 296/187.02, 203.03, 146.5, 146.6, 146.7, 187.01, 214; 280/748, 751, 777; 188/371–377; 267/153, 141, 182, 181, 136; 293/133, 102, 110; 74/492; 428/35.7, 120, 131; 52/735.1; 256/13.1, 1; 405/212; 404/6, 10

(56) References Cited

U.S. PATENT DOCUMENTS

| | | | | |
|---|---|---|---|---|
| 4,492,291 A | * | 1/1985 | Chometon et al. | 188/377 |
| 5,468,053 A | * | 11/1995 | Thompson et al. | 297/472 |
| 6,247,745 B1 | * | 6/2001 | Carroll et al. | 188/371 |
| 6,250,711 B1 | * | 6/2001 | Takahara | 296/187.05 |
| 6,428,086 B2 | * | 8/2002 | Takahara | 296/187.05 |
| 6,435,601 B2 | | 8/2002 | Takahara | 296/187.03 |
| 6,443,513 B1 | * | 9/2002 | Glance | 293/133 |
| 6,547,280 B1 | * | 4/2003 | Ashmead | 280/751 |
| 6,681,907 B2 | * | 1/2004 | Le | 188/371 |
| 6,682,128 B2 | * | 1/2004 | Carroll et al. | 296/187.03 |
| 6,715,592 B2 | * | 4/2004 | Suzuki et al. | 188/371 |
| 6,752,450 B2 | * | 6/2004 | Carroll et al. | 296/187.03 |
| 2002/0066984 A1 | | 6/2002 | Suzuki et al. | |
| 2002/0070584 A1 | | 6/2002 | Carroll, III et all. | 296/187.03 |

FOREIGN PATENT DOCUMENTS

| | | | |
|---|---|---|---|
| EP | 001213190 A2 | * | 6/2002 |
| EP | 001393988 A1 | * | 3/2004 |
| JP | 9-150692 A | | 6/1997 |
| JP | 10-24789 A | | 1/1998 |
| JP | 11-348699 A | | 12/1999 |
| JP | 2000-211454 | | 8/2000 |

OTHER PUBLICATIONS

STIC tranlsations of JP 9–150692A, JP11–348699A, JP2000–211454, JP10–24789A.*

* cited by examiner

*Primary Examiner*—Douglas C. Butler
(74) *Attorney, Agent, or Firm*—Burr & Brown

(57) ABSTRACT

A shock absorbing structure for a vehicle, including resin bodies spaced apart from each other, and at least one connecting body each connecting adjacent resin bodies. Each connecting body includes first and second connecting members which are made of a synthetic resin material having flexibility. Each of the connecting members connects the adjacent resin bodies such that each first connecting member and each second connecting member corresponding to each first connecting member are spaced apart from each other in a direction intersecting a direction in which the resin bodies are spaced apart from each other. At least one of the first connecting members and at least one of the second connecting members includes at least one curved/bent portion which is flexible in a plane perpendicular to a shock-receiving direction in which a shock is to be primarily applied to the resin bodies.

8 Claims, 9 Drawing Sheets

SHOCK ABSORBING STRUCTURE FOR VEHICLE

BACKGROUND OF THE INVENTION

1. Field of the Invention

The present invention relates in general to a shock absorbing structure for a vehicle. More particularly, the invention is concerned with such a shock absorbing structure which is capable of being disposed in narrow spaces having various different configurations.

2. Discussion of Related Art

In a motor vehicle or other vehicle, in general, a shock absorbing structure is provided to be located adjacently to an interior component, such as a pillar garnish, roof side rail, an instrument panel and a console box, which would be possibly brought into contact with an occupant's body in the event of a collision of the vehicle with a certain object. The shock absorbing structure is disposed on one of opposite sides of the interior component that is remote from an occupants' component of the vehicle, for alleviating an impact or shock applied to the occupant's body upon contact of the interior component with the occupant's body, so as to protect the occupant's body in the event of the collision.

The shock absorbing structure is conventionally formed of various materials such as a synthetic resin material, a metal material such as aluminum, and a paper-aluminum composite material. In particular, the shock absorbing structure formed of the synthetic resin material has excellent formability and advantageously has a reduced weight.

As such a shock absorbing structure formed of the synthetic resin material and having a good formability and a reduced weight, there are known various types of structures which have respective constructions. For instance, there is known a shock absorbing structure including a plurality of shock-absorbing main bodies which are made of a resin and are spaced apart from each other, and a plurality of connecting bodies each of which is made of a synthetic resin and connects adjacent two of the main bodies, so that the shock absorbing structure is provided by a single piece constituted by the main bodies and the connecting bodies.

As examples of such a shock absorbing structure, JP-A-9-150692, JP-A-11-348699, JP-A-2000-211454, and JP-A-2002-166804 (which are laid-open publications of unexamined Japanese Patent Applications) disclose respective structures each including (a) a plurality of shock-absorbing main bodies which are made of a resin and are spaced apart from each other, and (b) a connecting body/bodies made of a synthetic resin material. Each of the main bodies consists of a box-like body, polygonal tubular body, or tapered tubular body, for instance, and has a lateral wall which extends substantially in a direction in which a shock is primarily applied to the shock absorbing structure. Each connecting body in the form of a bar or a plate connects adjacent two of the main bodies, so that the shock absorbing structure is provided by a single piece constituted by the main bodies and the connecting body/bodies. JP-A-10-24789 discloses a shock absorbing structure including a plurality of main bodies each in the form of a rib formed of a synthetic resin material, and a substrate as a connecting body. The ribs are disposed on the substrate formed of a synthetic resin material such that the ribs are spaced apart from each other, so that the shock absorbing structure is provided by a single piece constituted by the main bodies and the connecting body.

The above-described conventional shock absorbing structures, wherein the shock-absorbing main bodies which are spaced apart from each other are connected by the connecting body or bodies, is designed such that a necessary number of the shock absorbing main bodies are positioned at necessary positions in the space located on the side of the interior component that will be likely to be brought into contact with the occupant's body in the event of the collision, which side is remote from the occupants' component of the vehicle. Upon application of a shock or impact to the shock absorbing structure, the main bodies are deformed or buckled, whereby the shock absorbing structure exhibits an effective shock absorbing capacity.

In general, the space located on the side of the interior component such as the pillar garnish or roof side rail varies in shape or configuration, depending upon the type of vehicle. Although the shock absorbing structure has the advantageous structure described above wherein the main bodies are connected by the connecting bodies, it has been a common practice to prepare various shock absorbing structures having respective different shapes which are designed in accordance with the different shapes of the spaces in the various types of vehicles, thereby problematically impeding an increase in the production efficiency and a reduction in the production cost of the shock absorbing structure.

It might be considered possible that the shock absorbing structure having the above-described structure is made compact in size so as to be accommodated in the narrow spaces having different configurations, and that the connecting members, each connecting adjacent ones of the main bodies and formed of a synthetic resin material having a high degree of flexibility, is curved or bent, so that the shock absorbing structure is accommodated in the narrow spaces by deformation or flexure of the connecting members following the configurations of the spaces.

In the shock absorbing structure disclosed in JP-A-9-150692 or JP-A-11-348699 described above, only one connecting member is disposed between adjacent ones of the main bodies so as to extend in a direction in which the main bodies are spaced apart from each other. In the thus constructed shock absorbing structure, the single connecting body is bent or curved so as to permit the adjacent ones of the main bodies to be easily positioned at desired positions. Accordingly, the shock absorbing structure can be easily installed in the accommodating space by deformation or flexure of the connecting body following the configuration of the space. In the disclosed shock absorbing structure, however, the strength with which the adjacent ones of the main bodies are connected to each other is inevitably insufficient since the adjacent ones of the main bodies are connected by only one connecting body.

Upon application of a shock to the thus constructed shock absorbing structure generated by contact of the occupant with the interior component of the vehicle, for instance, the connection between the adjacent ones of the shock-absorbing main bodies is undesirably broken, whereby the main bodies are displaced from respective positions that enable the main bodies to effectively absorb the shock applied to the structure. In this case, the amount of deformation of each main body upon application of the shock to the structure is insufficient, causing a risk of insufficient shock absorbing capacity of the structure.

In the shock absorbing structure disclosed in JP-A-10-24789, a plurality of shock-absorbing main bodies are disposed integrally with the connecting body in the form of the substrate which includes a plane perpendicular to the direction in which the shock or impact is applied to the main bodies. In this arrangement, while the strength with which the adjacent ones of main bodies are connected to each other is sufficient, it is quite difficult to curve or bend the connecting body in the form of the substrate in the above-described plane perpendicular to the shock-receiving direction even where the connecting body is formed of a synthetic resin material having flexibility.

In the shock absorbing structure disclosed in JP-A-2000-211454, two connecting bodies connect adjacent ones of the main bodies such that the two connecting bodies are spaced apart from each other, in a plane perpendicular to a direction in which the shock is applied to the main bodies, by a suitable distance in a direction perpendicular to the longitudinal direction of the structure in which the main bodies are spaced apart from each other. Unlike the single connecting member which connects the adjacent ones of the main bodies in the shock absorbing structure disclosed in the above-indicated publication, the two connecting members which connect the adjacent ones of the main bodies in the shock absorbing structure disclosed in JP-A-2000-211454 are difficult to be easily curved or bent in a plane perpendicular to the shock-receiving direction, by application of a force which causes the two connecting members to be curved or bent in that plane. This is because, upon application of the above-described force to the connecting members, at least one of the two connecting members tends to inhibit the adjacent two main bodies from moving toward or away from each other.

Thus, it is difficult to curve or bend the entirety of the shock absorbing structures disclosed in the above-described publications such as JP-A-10-24789 and JP-A-2000-211454. It is accordingly quite difficult to accommodate the disclosed shock absorbing structures into the accommodating space while the entirety of the structures is deformed or flexed therein following the configuration of the space.

SUMMARY OF THE INVENTION

It is therefore an object of the present invention to provide a shock absorbing structure which provides a high shock absorbing effect with respect to an impact or shock applied to the structure and which is compact in construction permitting the structure to be accommodated into any one of narrow spaces having respective different shapes or configurations, advantageously leading to an increase in the production efficiency and a reduction in the production cost of the shock absorbing structure.

The above-indicated object may be achieved according to a principle of the invention, which provides a shock absorbing structure for a vehicle, comprising: (a) a plurality of shock-absorbing main bodies which are made of a resin and which are spaced apart from each other with a predetermined spacing distance therebetween; and (b) at least one connecting body each connecting adjacent ones of the main bodies; wherein each of the at least one connecting body includes at least one first connecting member and at least one second connecting member which are made of a synthetic resin material having flexibility, each of the at least one first connecting member and each of the at least one second connecting member connecting the adjacent ones of the main bodies, such that the each first connecting member and the each second connecting member corresponding to the each first connecting member are spaced apart from each other in a direction intersecting a direction in which the plurality of main bodies are spaced apart from each other; and wherein at least one of the at least one first connecting member and the at least one second connecting member includes at least one curved/bent portion which is flexible in a plane perpendicular to a shock-receiving direction in which a shock is to be primarily applied to the plurality of main bodies.

In the shock absorbing structure constructed according to the present invention, at least one connecting body, each connecting the adjacent ones of the plurality of shock-absorbing main bodies, includes at least one first connecting member and at least one second connecting member. In this arrangement, the adjacent ones of the main bodies are connected to each other by two connecting members, i.e., the first and second connecting members, which are spaced apart from each other in a direction intersecting a direction in which the main bodies are spaced apart from each other. This arrangement assures an advantageously larger connecting strength with which the adjacent two main bodies are connected to each other, than in the conventional arrangement wherein the adjacent two main bodies are connected by a single connecting member. Accordingly, the present arrangement is effective to prevent the connection between the adjacent two main bodies from being broken upon application of the shock to the shock absorbing structure.

In the present shock absorbing structure arranged to prevent the breaking of the connection between the adjacent two main bodies upon application of the shock thereto, therefore, the shock-absorbing main bodies are prevented from being displaced from the respective positions that enable the main bodies to effectively absorb the shock applied to the structure, so that a reduction in the amount of deformation of each shock-absorbing main body can be advantageously prevented.

In the present shock absorbing structure, at least one of each first connecting member and each second connecting member includes at least one curved/bent portion which is flexible in the plane perpendicular to the shock-receiving direction. When the structure is subjected to a force which causes the first and second connecting members to be curved or bent in the above-indicated plane, each curved/bent portion formed in the above-indicated at least one of each first connecting member and each second connecting member is easily deformed such that the radius of curvature or the angle of bend of the curved/bent portion decreases or increases, although the adjacent two main bodies are connected to each other by the two connecting members. According to this arrangement, the first or second connecting member having the curved/bent portion does not tend to inhibit the adjacent ones of the main bodies from moving toward or away from each other. Thus, the present arrangement permits both of the first and second connecting members to be easily curved or bent. It is noted that the term "shock-receiving direction" defined as the direction in which the shock is primarily applied to the shock absorbing structure, may be interpreted to mean a direction in which the shock is actually applied to the structure, and also mean any direction which is close or almost parallel to the direction of the actual application of the shock.

In the shock absorbing structure according to the present invention, the at least one first connecting member and the at least one second connecting member are disposed between the adjacent ones of the main bodies so as to connect the main bodies, such that each first connecting member and each second connecting member corresponding to each first connecting member are spaced apart from each other, in the plane perpendicular to the shock-receiving direction, by a suitable distance in a direction which is perpendicular to (a) the shock-receiving direction and (b) to the longitudinal direction of the structure, for instance. In this arrangement, the first and second connecting members can be easily curved or bent in that plane, whereby the entirety of the shock absorbing structure can be easily deformed, i.e., curved or bent. Accordingly, the shock absorbing structure can be accommodated into the accommodating space even if the space has a shape or configuration different from that of the entire structure, so that the main bodies can be easily and reliably positioned in the respective positions within the space that enable the main bodies to effectively absorb the shock energy.

Thus, the present shock absorbing structure can be made compact in construction permitting the structure to be accommodated into any one of narrow spaces having respective different shapes or configurations while assuring a high degree of shock absorbing capacity, advantageously leading to an increase in the production efficiency and a reduction in the production cost of the shock absorbing structure.

According to one preferred form of the present invention, each of the at least one curved/bent portion is formed over an entire length of the at least one of the at least one first connecting member and the at least one second connecting member.

According to another preferred form of the present invention, each of the at least one curved/bent portion is formed in corresponding one of selected portions of the at least one of the at least one first connecting member and the at least one second connecting member.

According to still another preferred form of the present invention, the each of the at least one connecting body further includes a third connecting member linearly extending between the adjacent ones of the main bodies and made of a synthetic resin material which has flexibility but which has substantially no elasticity, the third connecting member inhibiting a relative movement of the adjacent ones of the main bodies in the direction in which the plurality of main bodies are spaced apart from each other. It is noted that the synthetic resin material having substantially no elasticity includes a synthetic resin material having no elasticity and a synthetic resin material having almost no elasticity.

In the shock absorbing structure arranged to prevent a relative displacement of the adjacent ones of the main bodies in the direction in which the main bodies are spaced apart from each other, the adjacent ones of the main bodies are effectively prevented from being displaced from the respective positions that enable the main bodies to effectively absorb the shock upon application of the shock thereto. Accordingly, the present shock absorbing structure prevents a decrease in the amount of deformation of each main body upon application of the shock thereto. Therefore, the present shock absorbing structure assures a high degree of shock absorbing capacity.

According to yet another preferred form of the present invention, both of the at least one first connecting member and the at least one second connecting member include the at least one curved/bent portion.

In the thus constructed shock absorbing structure, upon application of the force to the structure, which force causes the first and second connecting members to be curved or bent in the plane perpendicular to the shock-receiving direction, each curved/bent portion formed in each first connecting member and each second connecting member is easily deformed such that the radius of curvature or the angle of bend of the curved/bent portion decreases or increases. Therefore, both of the first and second connecting members do not inhibit the adjacent two main bodies from moving toward or away from each other, whereby both of the first and second connecting members can be further easily curved or bent.

According to the arrangement described above, the entirety of the shock absorbing structure is easily deformed, i.e., curved or bent, so that the present shock absorbing structure can be easily accommodated into any one of narrow spaces having respective different shapes or configurations with high reliability.

According to a further preferred form of the present invention, the at least one curved/bent portion is flexible in the shock-receiving direction.

According to a still further preferred form of the present invention, each of the at least one curved/bent portion is a curved portion which is flexible in the plane such that a radius of curvature of the curved portion is changed when the curved portion is flexed.

According to a yet further preferred form of the present invention, each of the at least one curved/bent portion is a bent portion which is flexible in the plane such that an angle of bend of the bent portion is changed when the bent portion is flexed.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

To further clarify the present invention, there will be described in detail shock absorbing structures for a vehicle constructed according to the preferred embodiments of this invention, by reference to the accompanying drawings.

Figure 1:
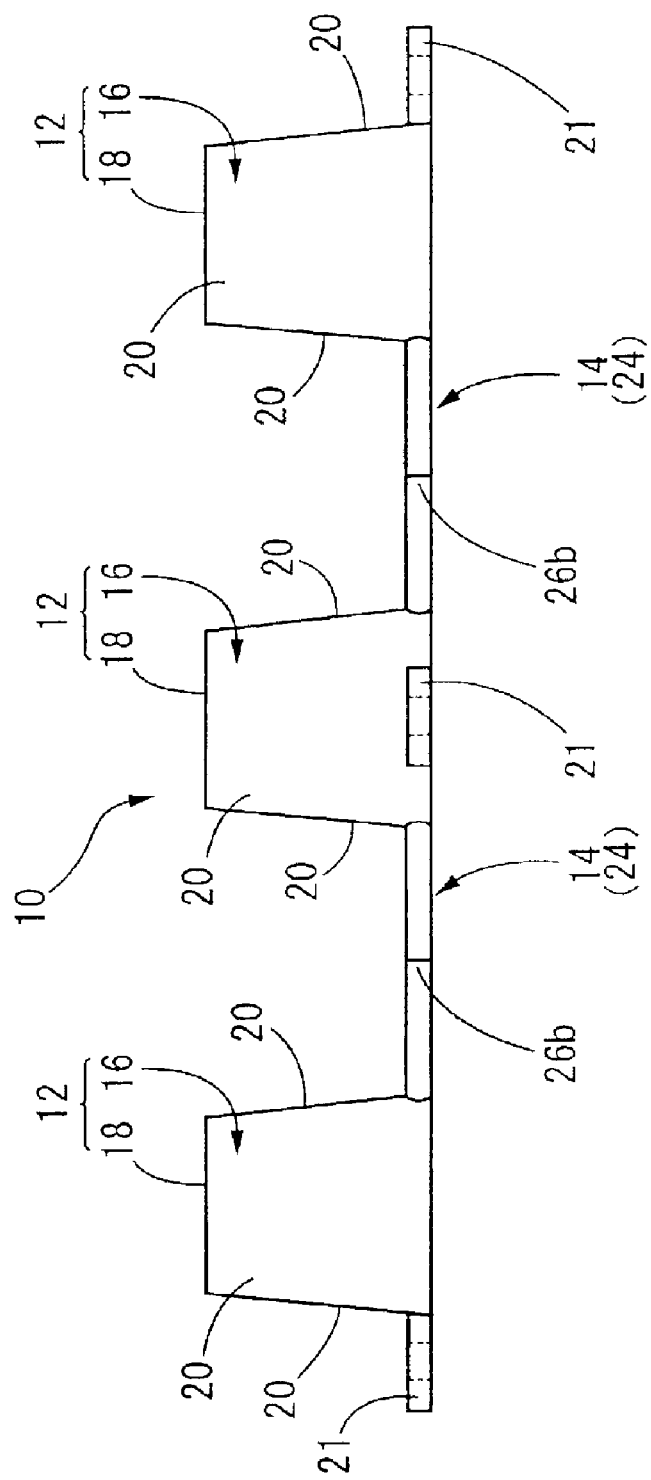
FIG. 1 is a front elevational view showing a shock absorbing structure constructed according to a first embodiment of this invention.
Figure 2:
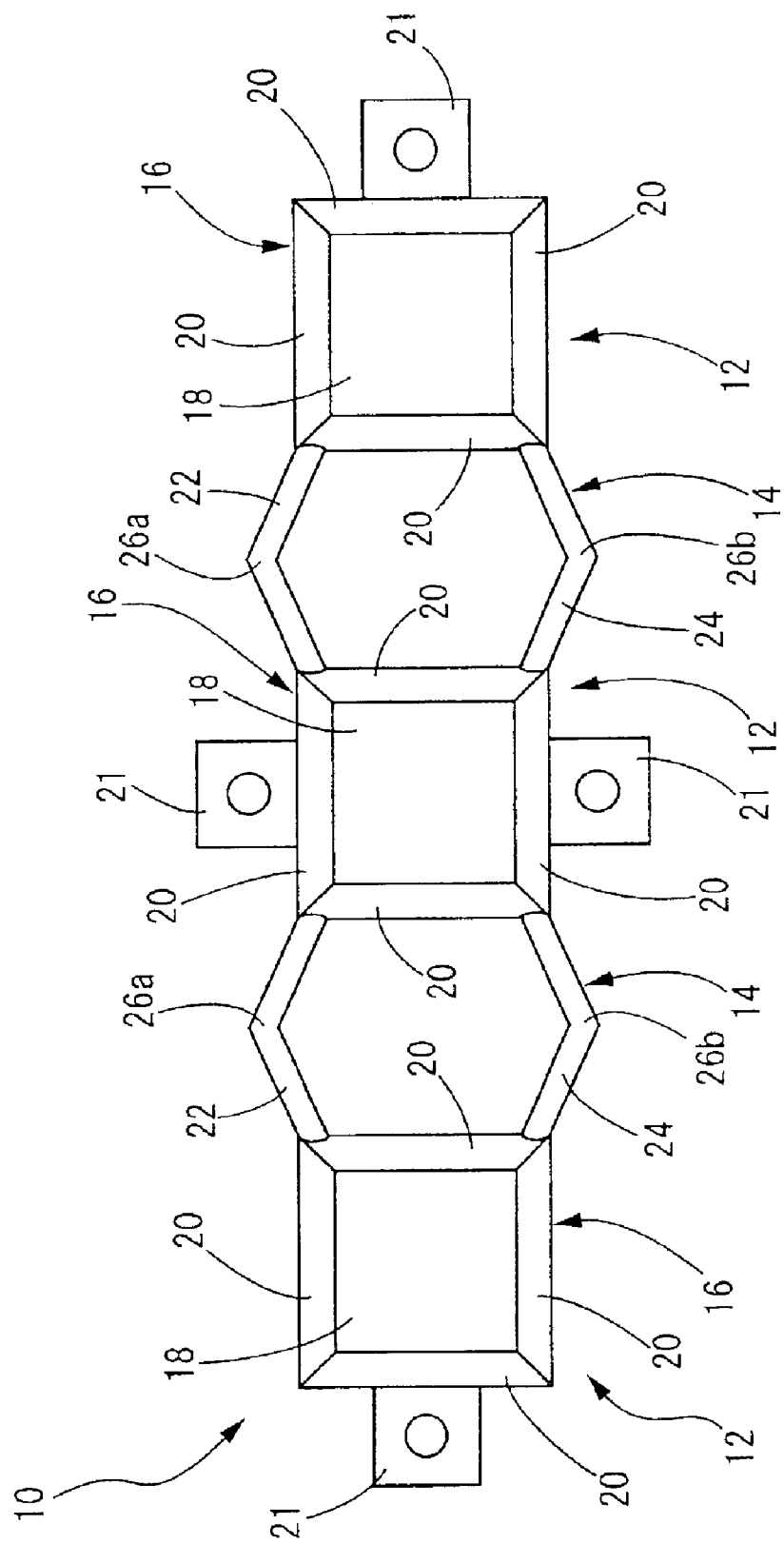
FIG. 2 is a plan view showing the shock absorbing structure of FIG. 1.

FIGS. 1 and 2 are front and plan views of a shock absorbing structure for a vehicle, constructed according to a first embodiment of the present invention. The shock absorbing structure generally indicated at 10 is disposed on one of opposite sides of a pillar garnish for a motor vehicle, which one is remote from a vehicle occupants' compartment of the motor vehicle. As is apparent from these figures, the shock absorbing structure 10 includes a plurality of shock-absorbing tubular main bodies 12 and a plurality of connecting bodies 14. The tubular main bodies 12 are spaced apart from each other in the longitudinal direction of the shock absorbing structure 10, and are connected by the connecting bodies 14.

Described more specifically, each of the shock-absorbing tubular main bodies 12 has a generally rectangular ceiling wall 18 and a peripheral or tubular wall 16 which consists of four lateral walls 20. Each of the four lateral walls 20 consists of a thin-walled, trapezoidal plate having upper and lower sides which are parallel to each other. The upper side of each lateral wall 20 is shorter than the lower side of each lateral wall 20 by a predetermined amount. Each lateral wall 20 extends in a direction slightly inclined with respect to the axis of the tubular main body 12 such that the distance from the lateral wall 20 to the axis is reduced as viewed in a direction away from the lower side of the lateral wall 20 toward the upper side of the lateral wall 20. This direction in which each lateral wall 20 extends will be referred to as "lateral-wall extending direction" in the following description. The ceiling wall 18 consists of a thin-walled plate having a thickness substantially equal to that of the trapezoidal plate of each lateral wall 20. The rectangular ceiling wall 18 is connected at its four sides with the upper sides of the respective lateral walls 20.

In other words, each shock-absorbing main body 12 has the tubular wall 16 which consists of the four lateral walls 20 extending in a direction in which the impact or shock is primarily applied to the shock absorbing structure 10 (i.e., the shock-receiving direction), and the ceiling wall 18 which is formed integrally with the tubular wall 16 so as to close the upper one of axially opposite opening ends of the tubular wall 16. The main body 12 has a rectangular shape in cross section taken in a plane perpendicular to the axis. The cross section has an area which gradually decreases as viewed in the direction away from the lower side of the lateral wall 20 toward the upper side of the lateral wall 20. Each main body 12 is made of an olefin resin material, such as polypropylene, polyethylene, and polybutene, having suitable degrees of deformability and flexibility.

In the present embodiment, each main body 12 can be easily deformed or buckled owing to the material having the suitable degree of deformability. Each main body 12 is easily deformed or buckled in the height or axial direction of the main body 12 upon application of a shock to the structure 10. In this instance, buckled portions of each lateral wall 20 of the main body 12 are prevented from being superposed on each other in the axial direction, owing to the arrangement in which the cross sectional area of the main body 12 reduces as viewed in the direction away from the axially proximal end of the main body 12 toward the axially distal end of the main body 12. In other words, the main body 12 is provided with a sufficiently low ratio that is expressed by b/a, where a represents the height of the main body 12 before the deformation of the structure 10, while b represents the height of the main body 12 after the deformation of the structure 10. Accordingly, the shock energy applied to the structure 10 can be sufficiently and effectively absorbed by each main body 12 which is easily deformed or buckled as described above. Each main body 12 is made relatively small in size, whereby the shock absorbing structure 10 is made compact in its entirety, so that the structure 10 can be accommodated in a space on the side of a pillar garnish of any one of various types of motor vehicles.

In the shock absorbing structure 10 of the present embodiment, the plurality of main bodies 12, i.e., three main bodies 12 in this embodiment, are provided to be arranged in a single straight line in the longitudinal direction of the structure 10, with a constant spacing distance therebetween, such that the lateral walls 20 of each pair of main bodies 12 adjacent to each other are opposed to each other in the longitudinal direction of the structure 10. In FIGS. 1 and 2, the reference numeral 21 denotes a fixing portion formed integrally with the main bodies 12, for fixing the structure 10 by a screw to a vehicle body such as a center pillar located on one of opposite sides of the pillar garnish which is remote from the vehicle occupants' compartment.

Each connecting body 14 is disposed between adjacent two main bodies 12 and includes a first connecting member 22 and a second connecting member 24 for connecting the adjacent two main bodies 12. Described more specifically, the first and second connecting members 22, 24 extend from respective widthwise opposite end portions of the lower end portion of the lateral wall 20 of one of the adjacent two main bodies 12, toward respective widthwise opposite end portions of the lower end portion of the lateral wall 20 of the other of the adjacent two main bodies 12. In other words, the first and second connecting members 22, 24 are spaced apart from each other by a suitable distance in a direction which is perpendicular to (a) the shock-receiving direction in which the shock is primarily applied to the main bodies 12 (i.e., the vertical direction as seen in the plane of FIG. 2), and (b) the longitudinal direction of the structure 10 in which the main bodies 12 are spaced apart from each other (i.e., the longitudinal direction as seen in the plane of FIG. 2). Each of the first and second connecting members 22, 24 is fixed at its longitudinally opposite end portions with the lower end portions of the respective mutually opposed lateral walls 20 of the adjacent two main bodies 12, so that the adjacent two main bodies 12 are connected to each other via the first and second connecting members 22, 24.

In the present embodiment, each of the first and second connecting members 22, 24 is a V-shaped bent rod member. Described more specifically, the first and second connecting members 22, 24 are bent in a plane perpendicular to the shock-receiving direction, such that the first connecting member 22 and the second connecting member 24 protrude outwardly. In other words, the first connecting member 22 has, at its longitudinal intermediate portion, a convex bent portion or outwardly bent portion 26a, which protrudes outwardly in one of the widthwise opposite directions of the mutually opposed lateral walls 20 of the adjacent two main bodies 12 (i.e., the upward direction as seen in FIG. 2), while the second connecting member 24 has, at its longitudinal intermediate portion, a convex bent portion or outwardly bent portion 26b, which protrudes outwardly in the other of the above-indicated widthwise opposite directions (i.e., the downward direction as seen in FIG. 2). Accordingly, the convex bent portion 26a of the first connecting member and the convex bent portion 26b of the second connecting member are spaced apart from each other as viewed in the widthwise direction of the mutually opposed lateral walls 20 of the adjacent two main bodies 12.

The first and second connecting members 22, 24 are made of a material similar to that for the main bodies 12. Namely, the first and second connecting members 22, 24 are made of a synthetic resin material such as the above-described olefin resin material, having a suitable degree of flexibility, so that the convex bent portions 26a, 26b of the first and second connecting members 22, 24 are flexible.

Figure 3:
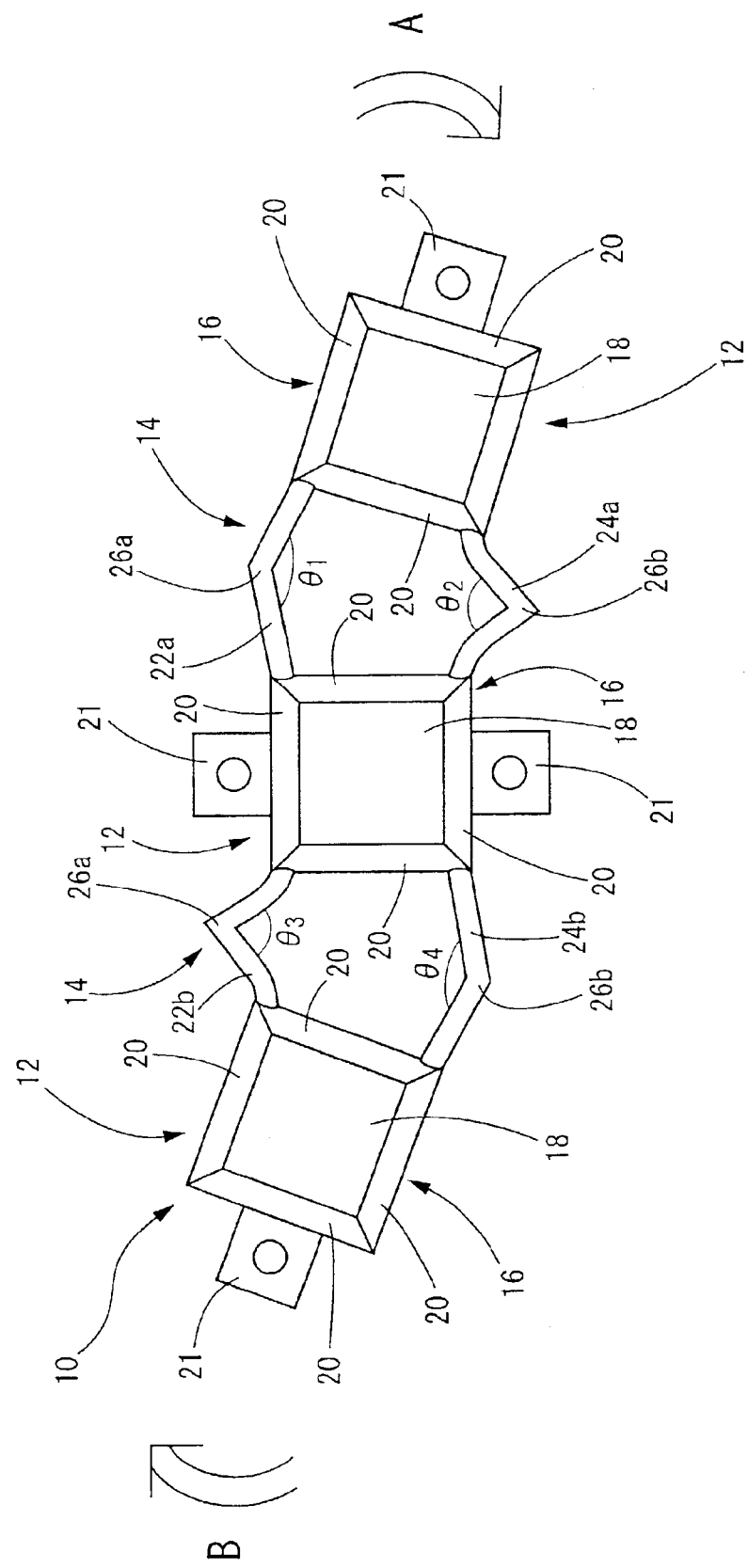
FIG. 3 is a view showing the shock absorbing structure of FIG. 1, in a deformed state.

When the thus constructed shock absorbing structure 10 is subjected to a force while preventing or minimizing a change in the distance between the middle main body 12 and the right-hand main body 12 of the three main bodies as seen in FIG. 3 (i.e., a center-to-center distance between the two main bodies 12), and when the above-indicated force causes the first and second connecting members 22a, 24a to be deformed (bent or curved) in the plane perpendicular to the shock-receiving direction, such that the right end portion of the structure 10 is displaced along a curve A (FIG. 3) in a clockwise direction, so as to displace the right end portion of the structure 10 in a direction in which the convex bent portion 26b of the second connecting member 24a protrudes, the convex bent portion 26a of the first connecting member 22a is deformed such that an internal angle or angle of bend $\theta_1$ of the convex bent portion 26a (FIG. 3) increases, so as to increase a distance between the mutually opposed lateral walls 20 of the middle main body 12 and the right-hand main body 12 connected by the first connecting member 22a, while the convex bent portion 26b of the second connecting member 24a is deformed such that an internal angle or angle of bend $\theta_2$ of the convex bent portion 26b (FIG. 3) decreases, so as to decrease a distance between the mutually opposed lateral walls 20 of the middle main body 12 and the right-hand main body 12 connected by the second connecting body 24a. According to this arrangement, the first and second connecting members 22, 24 can be easily deformed without inhibiting the adjacent two main bodies 12 from moving toward or away from each other.

On the other hand, when the shock absorbing structure 10 is subjected to a force while preventing or minimizing a change in the distance between the middle main body 12 and the left-hand main body 12 of the three main bodies as seen in FIG. 3 (i.e., a center-to-center distance between the two main bodies 12), and when the above-indicated force causes the first and second connecting members 22b, 24b to be deformed (bent or curved) in the plane perpendicular to the shock-receiving direction, such that the left end portion of the structure 10 is displaced along a curve B (FIG. 3) in a clockwise direction, so as to displace the left end portion of the structure 10 in a direction in which the convex bent portion 26a of the first connecting member 22b protrudes, the convex bent portion 26a of the first connecting member 22b is deformed such that an internal angle or angle of bend $\theta_3$ of the convex bent portion 26a (FIG. 3) decreases, so as to decrease a distance between the mutually opposed lateral walls 20 of the middle main body 12 and the left-hand main body 12 connected by the first connecting member 22b, while the convex bent portion 26b of the second connecting member 24b is deformed such that an internal angle or angle of bend $\theta_4$ of the convex bent portion 26b (FIG. 3) increases, so as to increase a distance between the mutually opposed lateral walls 20 of the middle main body 12 and the left-hand main body 12 connected by the second connecting body 24b. According to this arrangement, the first and second connecting members 22, 24 can be easily deformed without inhibiting the adjacent two main bodies 12 from moving toward or away from each other.

Even where the first and second connecting members 22, 24 are spaced apart from each other, in the plane perpendicular to the shock-receiving direction, by a suitable distance in the direction perpendicular to the longitudinal direction of the shock absorbing structure 10, the entirety of the structure 10 can be easily deformed, e.g., bent or curved, in the plane perpendicular to the shock-receiving direction, such that the structure 10 is smoothly curved to give an S-shaped configuration. As can be understood from the foregoing description, the first connecting member 22 and the second connecting member 24 respectively provide a first connecting member and a second connecting member, while each of the convex bent portion 26a of the first connecting member 22 and the convex bent portion 26b of the second connecting member 24 provides a curved/bent portion.

In the shock absorbing structure 10 constructed as described above, the first and second connecting members 22, 24 can be easily deformed, e.g., bent or curved, in the plane perpendicular to the shock-receiving direction, whereby the entirety of the structure 10 can be easily and smoothly deformed, e.g., bent or curved.

Even where the space on the side of a pillar garnish, which side is remote from the occupants' compartment of the vehicle, has a smoothly curved S-shaped configuration, the present shock absorbing structure 10 wherein the plurality of shock-absorbing main bodies 12 are linearly arranged in a straight line can be deformed into a substantially S-shaped configuration corresponding to that of the above-indicated space into which the structure 10 is accommodated, by bending or curving the first and second connecting members 22, 24. Accordingly, the structure 10 can be accommodated into the space such that the main bodies 12 are easily positioned with high reliability in the respective positions that enable the main bodies 12 to effectively absorb the shock energy.

In the present shock absorbing structure 10 wherein the adjacent two main bodies 12 are connected by the first connecting member 22 and the second connecting member 24, the connecting strength with which the adjacent two main bodies 12 are connected to each other is larger than that in the conventional arrangement wherein the adjacent two main bodies are connected by a single connecting member, so as to effectively prevent the connection between the adjacent two main bodies 12 from being broken upon application of the shock to the shock absorbing structure 10. In the present shock absorbing structure arranged to prevent the breaking of the connection between the adjacent two main bodies 12, therefore, the main bodies 12 are prevented from being displaced from the respective positions that enable the main bodies 12 to be sufficiently deformed for effectively absorbing the shock applied thereto, so that a reduction in the amount of deformation of each main body 12 upon application of the shock thereto can be advantageously prevented.

The present shock absorbing structure 10 constructed as described above can be easily and reliably accommodated, while exhibiting a sufficiently high degree of shock absorbing capacity, into the narrow space located on the side of the pillar garnish, which side is remote from the occupants' compartment of the vehicle and having a configuration different from that of the structure 10. Accordingly, the present shock absorbing structure 10 can be installed in any one of narrow spaces having various shapes, leading to an increase in the production efficiency and a reduction in the production cost of the shock absorbing structure.

In the present embodiment, when the shock absorbing structure 10 is subjected to a force while preventing or minimizing the change in the distance between the adjacent two main bodies 12, and when the above-indicated force causes the first and second connecting members 22, 24 to be deformed (bent or curved) in the plane perpendicular to the shock-receiving direction, one of the convex bent portion 26a of the first connecting member 22 and the convex bent portion 26b of the second connecting member 24 is deformed such that the angle of bend of the convex bent portion 26a or 26b increases, while the other of the convex bent portions 26a and 26b is deformed such that the angle of bend of the convex bent portion 26a or 26b decreases. By deforming the first and second connecting members 22, 24 as described above, the entirety of the shock absorbing structure 10 is deformed, i.e., curved or bent, without a substantial change in its length, into a configuration corresponding to that of the accommodating space on the side of the pillar garnish, which side is remote from the occupants' compartment. According to this arrangement, the shock absorbing structure 10 is designed such that the entire length of the structure 10 corresponds to the length of the accommodating space in which the structure 10 is accommodated, facilitating the design of the structure 10.

In the present embodiment, for deforming the first and second connecting members 22, 24 while preventing or minimizing the change in the distance between the adjacent two main bodies 12, one of the convex bent portion 26a and the convex bent portion 26b of the respective first and second connecting members 22, 24 is deformed such that the angle of bend of the convex bent portion 26a or 26b increases, while the other of the convex bent portions 26a and 26b is deformed such that the angle of bend of the convex bent portion 26a or 26b decreases. For deforming the first and second connecting members 22, 24 so as to reduce the distance between the adjacent two main bodies 12, it is noted that both of the convex bent portion 26a of the first connecting member 22 and the convex bent portion 26b of the second connecting member 24 are deformed such that the angles of bend of both of the convex bent portions 26a, 26b decrease. For deforming the first and second connecting members 22, 24 so as to increase the distance between the adjacent two main bodies 12, it is noted that both of the convex bent portion 26a of the first connecting member 22 and the convex bent portion 26b of the second connecting member 24 are deformed such that the angles of bend of both of the convex bent portions 26a, 26b increase.

In the present shock absorbing structure 10 wherein the first and second connecting members 22, 24 are made of the resin material having the suitable degree of flexibility, the entirety of the structure 10 is easily deformed in the shock-receiving direction while the first and second connecting members 22, 24 are also deformed in the shock-receiving direction. Accordingly, the present shock absorbing structure 10 is capable of being easily and reliably installed in any one of narrow spaces having respective different shapes, and exhibiting an excellent shock absorbing capacity.

In the present embodiment, the first connecting member 22 has, at its longitudinal intermediate portion, one flexible curved/bent portion in the form of the convex bent portion 26a which protrudes in one of the widthwise opposite directions of the mutually opposed lateral walls 20 of the adjacent two main bodies 12, while the second connecting member 24 has, at its longitudinal intermediate portion, one flexible curved/bent portion in the form of the convex bent portion 26b which protrudes in the other of the widthwise opposite directions of the mutually opposed lateral walls 20 of the adjacent two main bodies 12. The configuration and structure of each of the first and second connecting members 22, 24 are not particularly limited, as long as at least one of the first and second connecting members 22, 24 has at least one flexible curved/bent portion.

Figure 4:
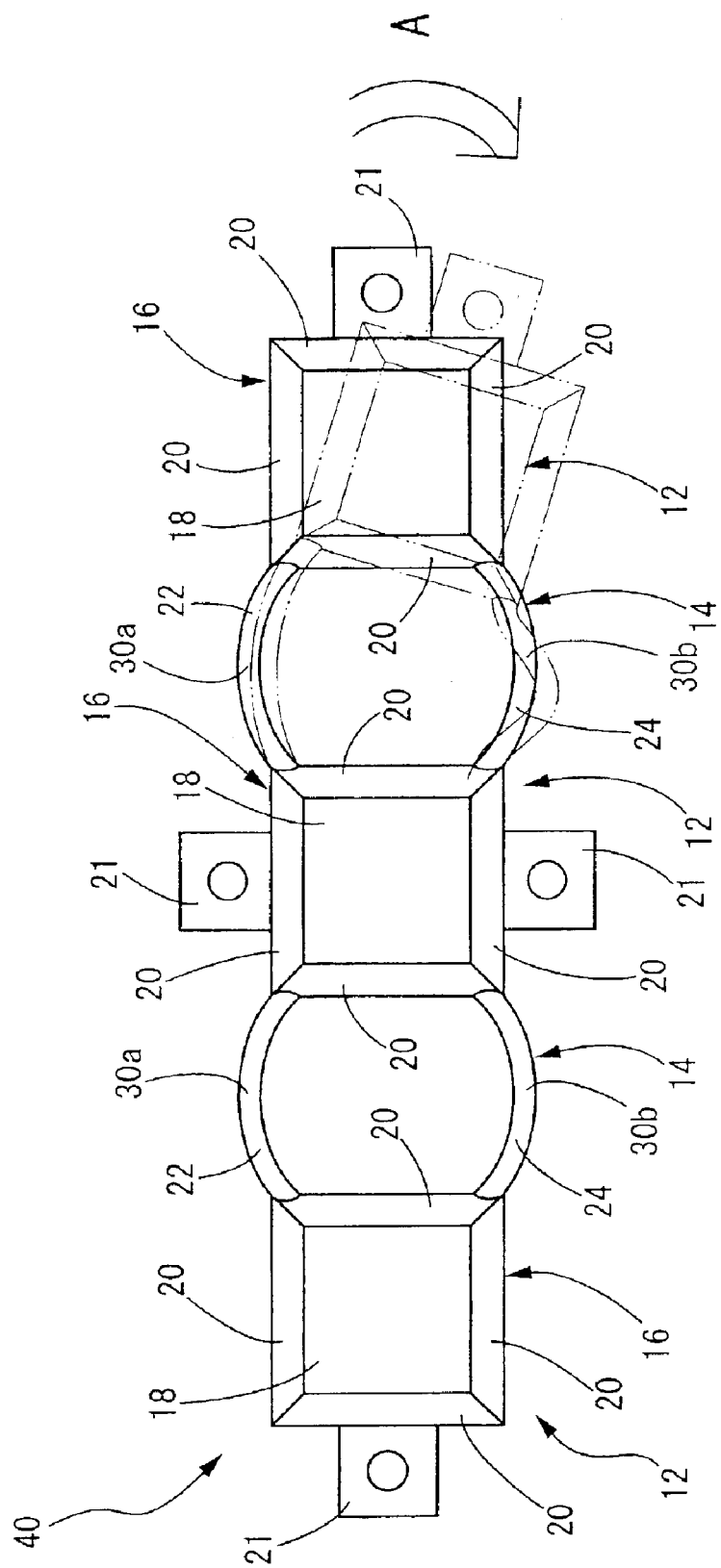
FIG. 4 is a plan view showing a shock absorbing structure constructed according to a second embodiment of the invention.

Reference is now made to FIG. 4 which shows a shock absorbing structure 40 constructed according to a second embodiment of this invention. In the shock absorbing structure 40 of this second embodiment, the first connecting member 22 has, at its longitudinal intermediate portion, one flexible curved/bent portion in the form of a convex curved portion or outwardly curved portion 30a which protrudes outwardly in one of the widthwise opposite directions of the mutually opposed lateral walls 20 of the adjacent two main bodies 12, while the second connecting member 24 has, at its longitudinal intermediate portion, one curved/bend portion in the form of a convex curved portion or outwardly curved portion 30b which protrudes outwardly in the other of the widthwise opposite directions of the mutually opposed lateral walls 20 of the adjacent two main bodies. In other words, the first and second connecting members 22, 24 of the structure 40 according to this embodiment are curved rod members which are spaced apart from each other in the widthwise direction of the mutually opposed lateral walls 20 of the adjacent two main bodies 12. In this second embodiment of FIG. 4 and the following embodiments of FIGS. 5–9, the same reference numerals as used in the above-described first embodiment of FIGS. 1–2 are used to identify the corresponding components, and a detailed explanation of which is dispensed with.

In the thus constructed shock absorbing structure 40 of this embodiment wherein the adjacent two main bodies 12 are connected to each other by the first and second connecting members 22, 24, when the structure 40 is subjected to a force which causes the first and second connecting members 22, 24 to be curved or bent in the plane perpendicular to the shock-receiving direction, such that the right end portion of the structure 40 is displaced along a curve A (FIG. 4) in a clockwise direction, so as to displace the right end portion of the structure 40 in a direction in which the convex curved portion 30b of the second connecting member 24 protrudes, as indicated by two-dot chain lines in FIG. 4, the convex curved portion 30a of the first connecting member 22 is deformed such that a radius of curvature of the convex curved portion 30a increases, while the convex curved portion 30b of the second connecting member 24 is deformed such that a radius of curvature of the convex curved portion 30b decreases. The thus constructed shock absorbing structure 40 according to this second embodiment effectively assures advantages similar to those described with respect to the structure 10 according to the above-described first embodiment.

Figure 5:
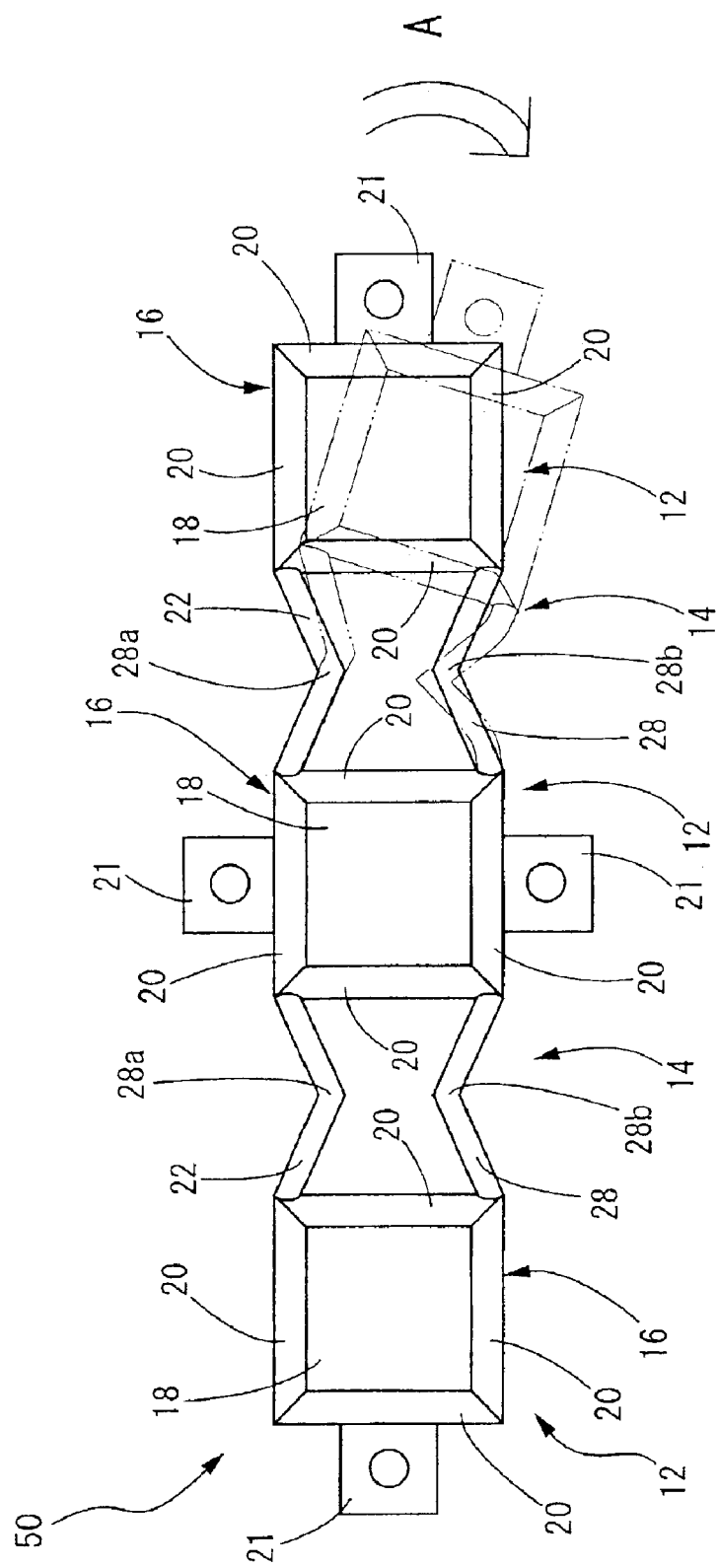
FIG. 5 is a plan view showing a shock absorbing structure constructed according to a third embodiment of the invention.
Figure 6:
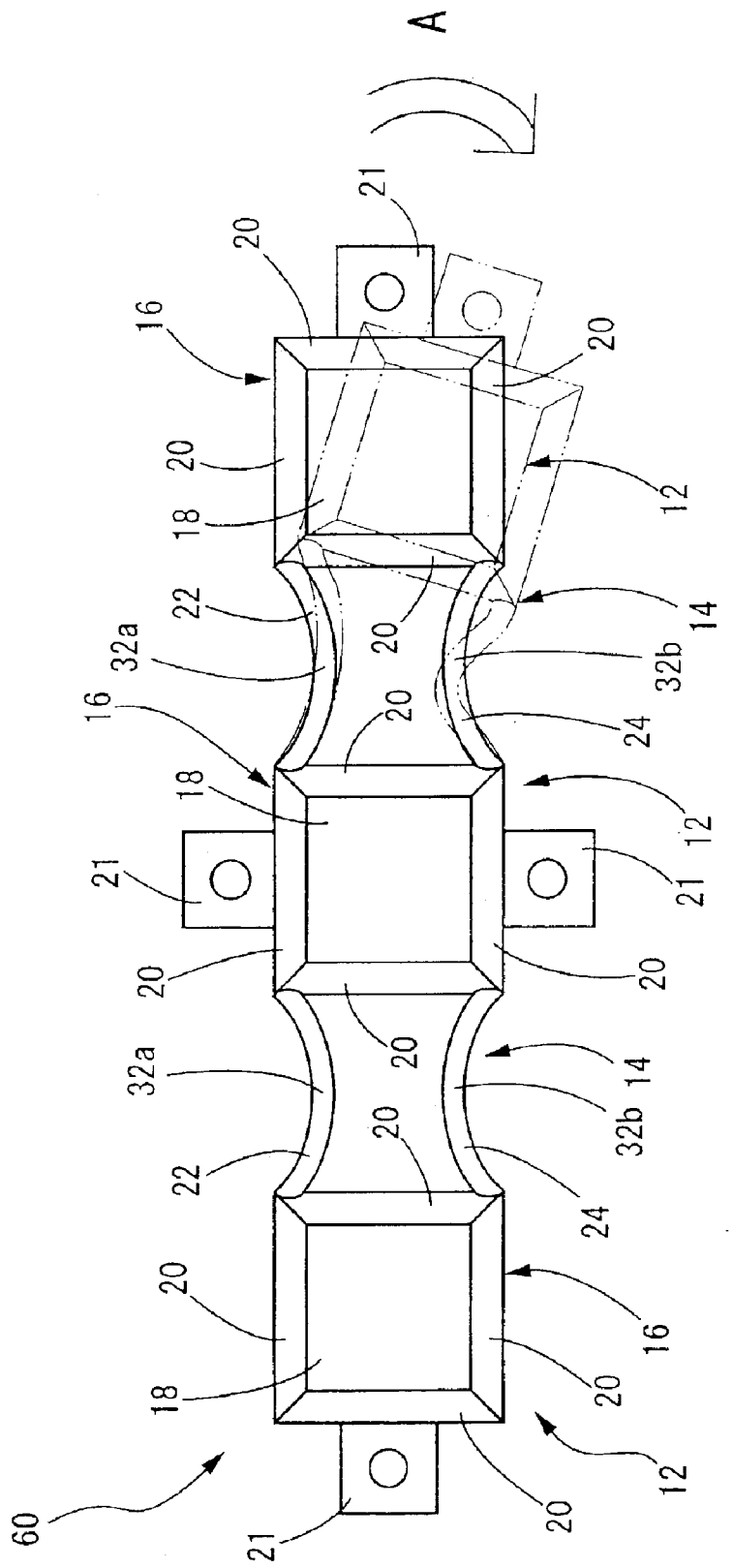
FIG. 6 is a plan view showing a shock absorbing structure constructed according to a fourth embodiment of the invention.

By referring next to FIG. 5 and FIG. 6, there will be respectively explained a shock absorbing structure 50 constructed according to a third embodiment of this invention, and a shock absorbing structure 60 constructed according to a fourth embodiment of this invention. In the shock absorbing structure 50, the first and second connecting members 22, 24 respectively have, at their longitudinal intermediate portions, a concave bent portion or inwardly bent portion 28a, and a concave bent portion or inwardly bent portion 28b, which two bent portions 28a, 28b protrude inwardly in the widthwise direction of the mutually opposed lateral walls 20 of the adjacent two main bodies 12. In the shock absorbing structure 60 shown in FIG. 6, the first and second connecting members 22, 24 respectively has, at their longitudinal intermediate portions, a concave curved portion or inwardly curved portion 32a, and a concave curved portion or inwardly curved portion 32b, which two curved portions 32a, 32b protrude inwardly in the widthwise direction of the mutually opposed lateral walls 20 of the adjacent two main bodies 12.

When the thus constructed shock absorbing structure 50 according to the third embodiment wherein the adjacent two main bodies 12 are connected to each other by the first and second connecting members 22, 24 is subjected to a force which causes the first and second connecting members 22, 24 to be curved or bent in the plane perpendicular to the shock-receiving direction, such that the right end portion of the structure 50 is displaced along a curve A (FIG. 5) in a clockwise direction, so as to displace the right end portion of the structure 50 in a direction in which the concave bent portion 28*a* of the first connecting member 22 protrudes, as indicated by two-dot chain lines in FIG. 5, the concave bent portion 28*a* of the first connecting member 22 is deformed such that the angle of bend of the concave bent portion 28*a* increases, while the concave bent portion 28*b* of the second connecting member 24 is deformed such that the angle of bend of the concave bent portion 28*b* decreases. Similarly, when the shock absorbing structure 60 according to the fourth embodiment is subjected to a force which causes the first and second connecting members 22, 24 to be curved or bent in the plane perpendicular to the shock-receiving direction, such that the right end portion of the structure 60 is displaced along a curve A (FIG. 6) in a clockwise direction, so as to displace the right end portion of the structure 60 in a direction in which the concave curved portion 32*a* of the first connecting member 22 protrudes, as indicated by two-dot chain lines in FIG. 6, the concave curved portion 32*a* of the first connecting member 22 is deformed such that the radius of curvature of the concave curved portion 32*a* increases, while the concave curved portion 32*b* of the second connecting member 24 is deformed such that the radius of curvature of the concave curved portion 32*b* decreases. The thus constructed shock absorbing structure 50 according to the third embodiment and the shock absorbing structure 60 according to the fourth embodiment effectively assure advantages similar to those described with respect to the structure 10 according to the above-described first embodiment.

Figure 7:
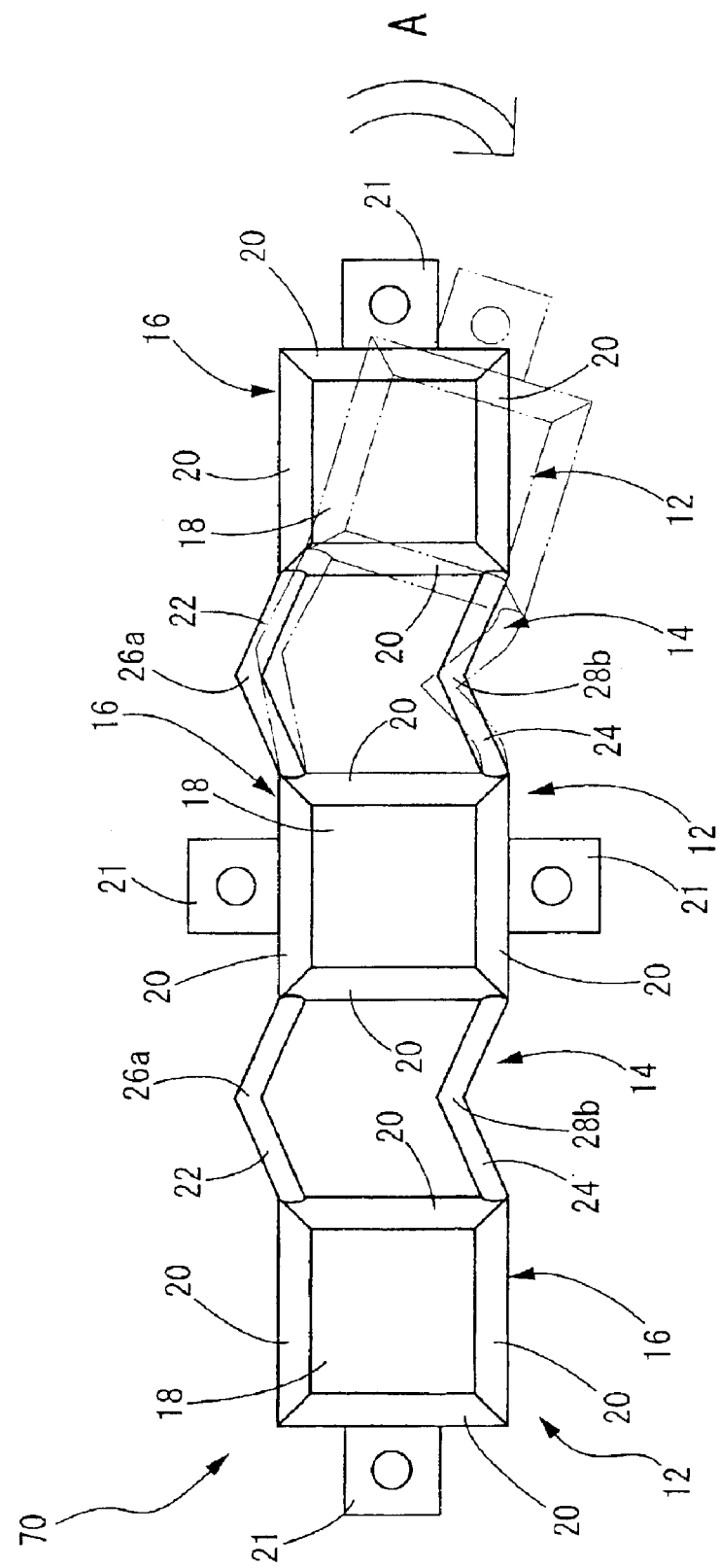
FIG. 7 is a plan view showing a shock absorbing structure constructed according to a fifth embodiment of the invention.

Referring next to FIG. 7, there is shown a shock absorbing structure 70 constructed according to a fifth embodiment of this invention. In the shock absorbing structure 70, the first connecting member 22 has one convex bent portion 26*a* while the second connecting member 24 has one concave bent portion 28*b*. When the thus constructed structure 70 is subjected to a force which causes the first and second connecting members 22, 24 to be curved or bent in the plane perpendicular to the shock-receiving direction, such that the right end portion of the structure 70 is displaced along a curve A (FIG. 7) in a clockwise direction, so as to displace the right end portion of the structure 70 in a direction opposite to the direction in which the convex bent portion 26*a* and the concave bent portion 28*b* protrude, as indicated by two-dot chain lines in FIG. 7, the convex bent portion 26*a* of the first connecting member 22 is deformed such that the angle of bend of the convex bent portion 26*a* increases, while the concave bent portion 28*b* of the second connecting member 24 is deformed such that the angle of bend of the concave bent portion 28*b* decreases. The thus constructed shock absorbing structure 70 according to this fifth embodiment effectively assures advantages similar to those described with respect to the structure 10 according to the above-described first embodiment.

In the shock absorbing structure 70 shown in FIG. 7, the convex bent portion 26*a* and the concave bent portion 28*b* formed in the first and second connecting members 22, 24, respectively, may be replaced with any one of a combination of the convex curved portion 30*a* and the concave curved portion 32*b*, a combination of the concave bent portion 28*a* and the convex bent portion 26*b*, and a combination of the concave curved portion 32*a* and the convex curved portion 30*b*.

In the illustrated embodiments, the first and second connecting members 22, 24 may have respective different ones of the convex bent portions 26*a*, 26*b*, concave bent portions 28*a*, 28*b*, convex curved portions 30*a*, 30*b*, and concave curved portions 32*a*, 32*b*.

The angle of bend of each of the convex bent portions 26*a*, 26*b* and concave bent portions 28*a*, 28*b*, and the radius of curvature of each of the convex curved portions 30*a*, 30*b* and concave curved portions 32*a*, 32*b* are not limited to those in the illustrated embodiments. Further, the radius of curvature/the angle of bend of the curved/bent portion formed in the first connecting member 22 may be different from the radius of curvature/the angle of bend of the curved/bent portion formed in the second connecting member 24.

In the illustrated embodiments, the first and second connecting members 22, 24 respectively have one curved/bent portion suitably selected from the convex bent portions 26*a*, 26*b*, concave bent portions 28*a*, 28*b*, convex curved portions 30*a*, 30*b*, and concave curved portions 32*a*, 32*b*. The first and second connecting members 22, 24 may respectively have a plurality of curved/bent portions. For instance, the first connecting member 22 may be provided with the convex bent portion 26*a* and the concave bent portion 28*a* which are formed alternately with each other, in a zigzag fashion. Similarly, the second connecting member 24 may be provided with the convex bent portion 26*b* and the concave bent portion 28*b* which are formed alternately with each other, in a zigzag fashion. Further, the first connecting member 22 may be provided with the convex curved portion 30*a* and the concave curved portion 32*a* which are formed alternately with each other, in a corrugated fashion. Similarly, the second connecting member 24 may be provided with the convex curved portion 30*b* and the concave curved portion 32*b* which are formed alternately with each other, in a corrugated fashion. Further, at least one suitably selected curved/bent portion may be formed over the entire axial length of the first and second connecting members 22, 24. Alternatively, at least one suitably selected curved/bent portion may be formed in corresponding one of selected portions of the first and second connecting members 22, 24.

In the illustrated embodiments, the entirety of each of the first and second connecting members 22, 24 is curved or bent by provision of the curved/bent portion. The first and second connecting members 22, 24 may be curved or bent at their local portions corresponding to the at least one curved/bent portion.

In the illustrated embodiments, the adjacent two main bodies 12 are connected by a single first connecting member 22 and a single second connecting member 24. A plurality of the first connecting members 22 and/or a plurality of second connecting members 24 may be disposed between the adjacent two main bodies 12.

The positions of the main body 12 to which the first and second connecting members 22, 24 are respectively connected are not limited to those in the illustrated embodiments.

The configuration of the curved/bent portion formed in each of the first and second connecting members 22, 24 is not limited to the detail of the above-illustrated embodiments. While the curved/bent portion has the V-shape or curved shape in the illustrated embodiments, the curved/bent portion may have any other shape such as an L-shape or a stepped shape.

Figure 8:
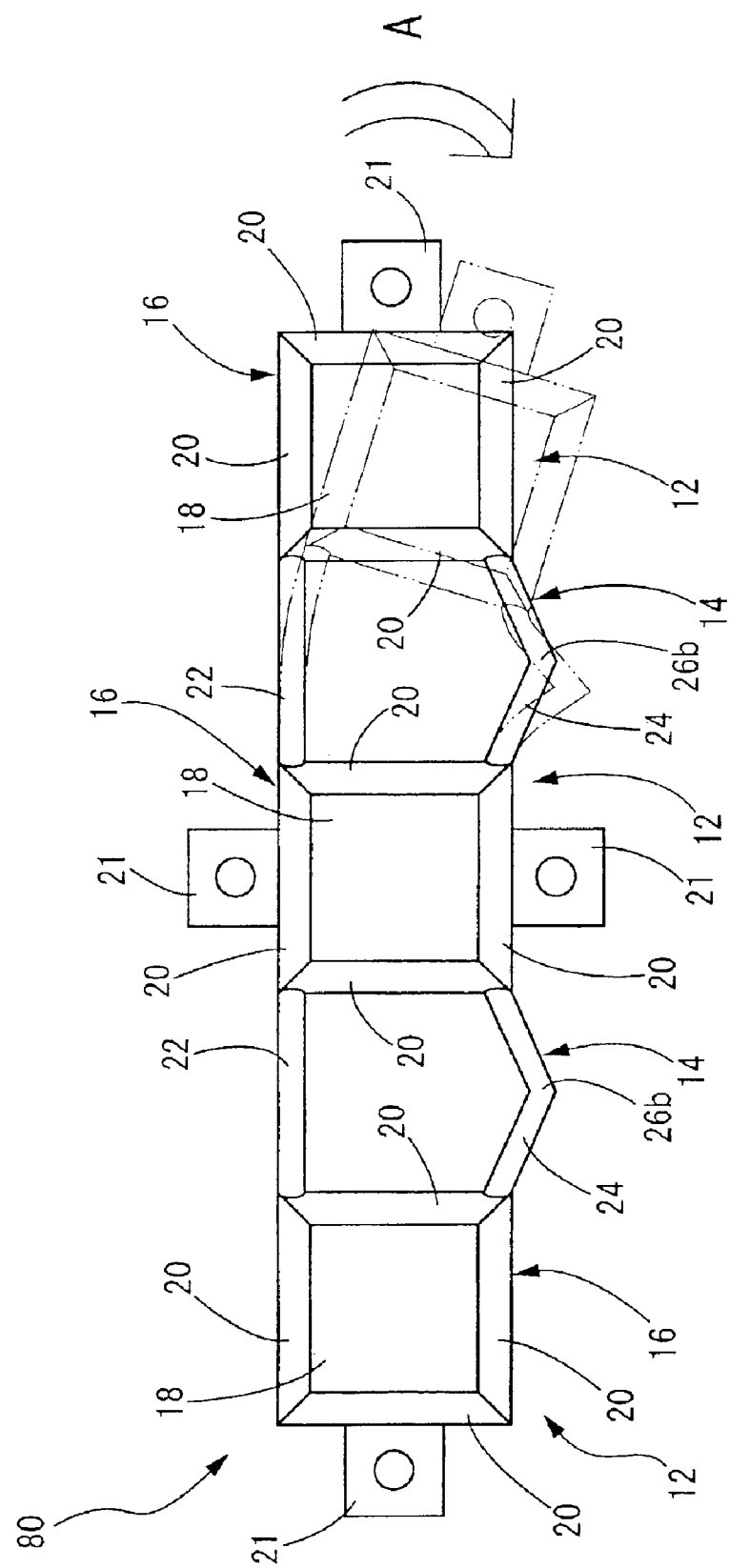
FIG. 8 is a plan view showing a shock absorbing structure constructed according to a sixth embodiment of the invention.

While both of the first and second connecting members 22, 24 respectively have the curved/bent portions in the illustrated embodiments, only one of the first and second connecting members 22, 24 may have the curved/bent portion as shown in FIG. 8 which indicates a shock absorbing structure 80 constructed according to a sixth embodiment of this invention. In the structure 80 shown in FIG. 8, only the second connecting member 24 has the curved/bent portion in the form of the convex bent portion 26b.

When the shock absorbing structure 80 wherein only the second connecting member 24 has the curved/bent portion, i.e., the convex bent portion 26b, is subjected to a force which causes the first and second connecting members 22, 24 to be curved or bent in the plane perpendicular to the shock-receiving direction, such that the right end portion of the structure 80 is displaced along a curve A (FIG. 8) in a clockwise direction, so as to displace the right end portion of the structure 80 in a direction in which the convex bent portion 26b protrudes, as indicated by two-dot chain lines in FIG. 8, the convex bent portion 26b of the second connecting member 24 is deformed such that the angle of bend of the convex bent portion 26b decreases, while the entirety of the first connecting member 22 is deformed such that the first connecting member 22 curved or bent so as to protrude in a direction opposite to the direction in which the convex bent portion 26b of the second connecting member 24 protrudes.

When the thus constructed shock absorbing structure 80 is subjected to the force which causes the first and second connecting members 22, 24 to be deformed (curved or bent) in the plane perpendicular to the shock-receiving direction, the first and second connecting members 22, 24 can be easily deformed without inhibiting the adjacent two main bodies 12 from moving toward or away from each other. Therefore, the shock absorbing structure 80 according to the sixth embodiment assures advantages similar to those described with respect to the structure 10 according to the above-described first embodiment.

Figure 9:
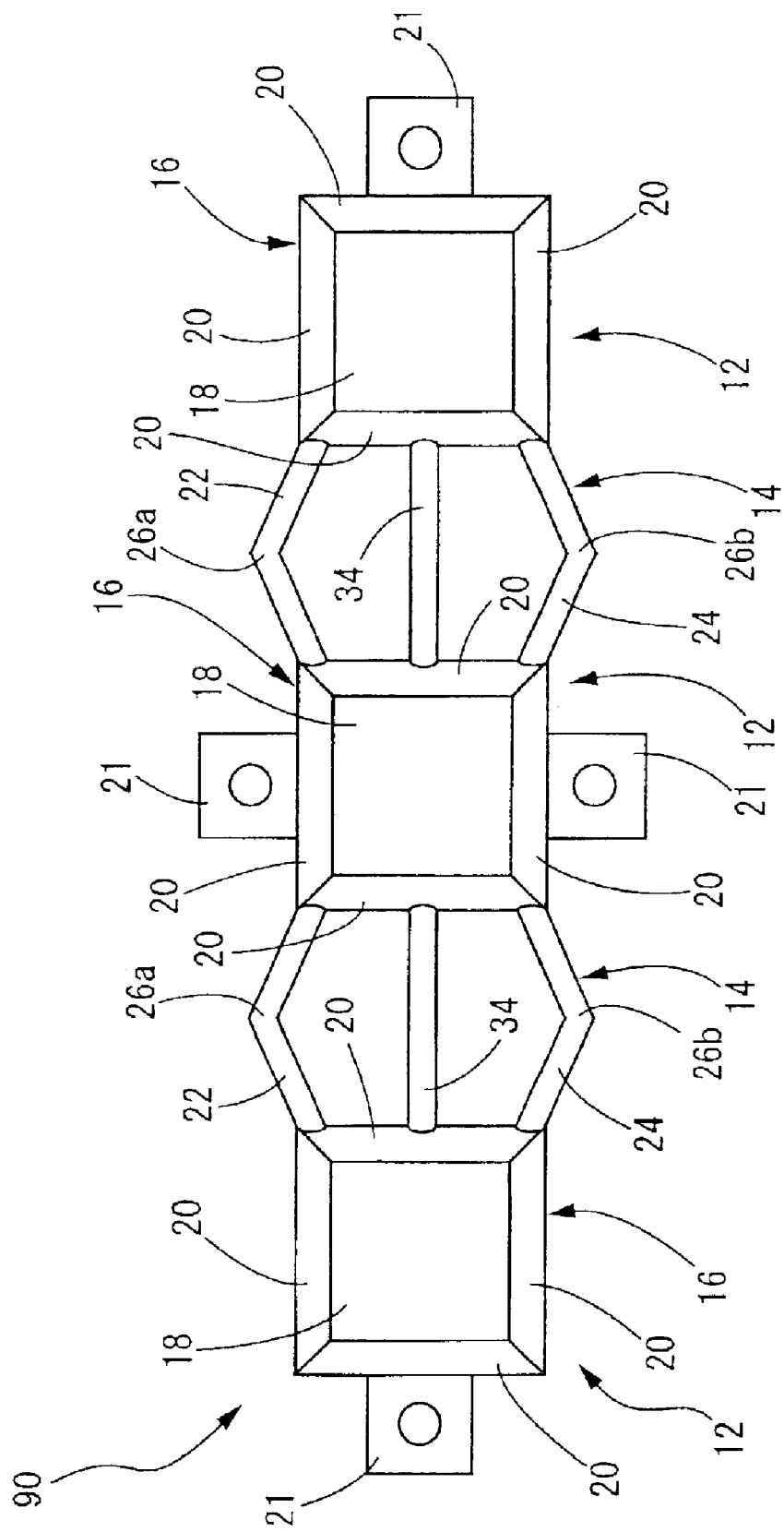
FIG. 9 is a plan view showing a shock absorbing structure constructed according to a seventh embodiment of the invention.

Referring next to FIG. 9, there is shown a shock absorbing structure 90 constructed according to a seventh embodiment of the invention. In the structure 90 of the present embodiment, in addition to the first and second connecting members 22, 24 having the respective curved/bent portions (i.e., the convex bent portion 26a and the convex bent portions 26b), a third connecting member in the form of an intermediate connecting member 34 is disposed between the adjacent two main bodies 12, such that the intermediate connecting member 34 linearly extends between the two main bodies 12 in a direction parallel to the longitudinal direction of the structure 90 in which the main bodies 12 are spaced apart from each other. The intermediate connecting member 34 is fixed at its longitudinal opposite ends with the widthwise intermediate portions of the respective mutually lateral walls 20 of the adjacent two main bodies 12. In the present embodiment, the connecting body 14 consists of the first connecting member 12, second connecting member 24, and intermediate connecting member 34.

The intermediate connecting member 34 is made of a synthetic resin material which has flexibility but which has substantially no elasticity, so that the intermediate connecting member 34 inhibits a relative movement of the adjacent ones of the main bodies 12 connected by the three connecting members 22, 24, 34, in a direction in which the intermediate connecting member 34 extends, in other words, in the direction in which the main bodies 12 are spaced apart from each other. It is to be understood that the synthetic resin material having flexibility but having substantially no elasticity includes a synthetic resin material which does not have elasticity and a synthetic resin material which has almost no elasticity. While the third connecting member in the form of the intermediate connecting member 34 is preferably disposed intermediate between the first and second connecting members 22, 24 in the direction perpendicular to the longitudinal direction of the structure 90, the third connecting member need not be disposed between the first and second connecting members 22, 24, as long as the third connecting member 34 is deposed between the adjacent ones of the main bodies 12.

In the thus constructed shock absorbing structure 90 according to the seventh embodiment, the adjacent ones of the main bodies 12 are prevented from moving relative to each other in the longitudinal direction in which the main bodies 12 are spaced from each other, owing to the provision of the third connecting member 34 which cooperates with the first and second connecting members 22, 24 to connect the adjacent ones of the main bodies 12. Accordingly, the present arrangement effectively prevents the main bodies 12, upon application of the shock to the structure 90, from displacing from the respective positions that enable the main bodies 12 to be sufficiently deformed for effectively absorbing the shock energy, for thereby preventing a deterioration in the shock absorbing capacity of the structure 90 due to a reduction in the amount of deformation of each main body 12 upon application of the shock applied thereto.

While the presently preferred embodiments of the invention have been described in detail, for illustrative purpose only, it is to be understood that the present invention is not limited to the details of the illustrated embodiments, but may be otherwise embodied.

In the illustrated embodiments, each main body 12 is constituted by the polygonal tubular wall having the rectangular shape in its cross section taken in a plane perpendicular to its axis, and the upper one of the axially opposite opening ends of the tubular wall is closed. The configuration and structure of the main body 12 are not particularly limited, as long as the main body 12 exhibits the shock absorbing capacity. For instance, the main body 12 may be constituted by the polygonal tubular wall, the axially opposite opening ends of which are not closed. Alternatively, the main body 12 may be constituted by a cylindrical or tapered tubular body, or a box-like body, the axially opposite opening ends of which may or may not be closed. Further, the main body 12 may be constituted by a rib structure having a plurality of ribs integrally formed of a synthetic resin material.

The number of the main bodies 12 is not limited to that in the illustrated embodiments.

While the main bodies 12 connected by the connecting bodies 14 are arranged along the single line in the illustrated embodiments, the main bodies 12 may be arranged along two or more lines.

While the illustrated embodiments of the invention are the shock absorbing structures which are advantageously mounted on the inside of a pillar garnish of a motor vehicle, it is to be understood that the principle of the invention is equally applicable to shock absorbing structures to be mounted on the inside of other vehicle interior component such as a roof side rail, and also to shock absorbing structures to be incorporated in any vehicles other than the motor vehicle.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

CROSS-REFERENCE TO RELATED APPLICATION

The present application claims priority under 35 U.S.C. § 119 to Japanese Patent Application No. 2002-248124, filed on Aug. 28, 2002, entitled "Shock absorbing structure for vehicle." The contents of that application are incorporated herein by reference in their entirety.

What is claimed is:

1. A shock absorbing structure for a vehicle, comprising:
   a plurality of shock-absorbing main bodies which are made of a resin and which are spaced apart from each other with a predetermined spacing distance therebetween; and
   at least one connecting body, each said connecting body connecting adjacent ones of said main bodies;
   wherein each of said at least one connecting body includes at least one first connecting member and at least one second connecting member which are made of a synthetic resin material having flexibility, each of said at least one first connecting member and each of said at least one second connecting member connecting said adjacent ones of said main bodies, such that said each first connecting member and said each second connecting member corresponding to said each first connecting member are spaced apart from each other in a direction intersecting a direction in which said plurality of main bodies are spaced apart from each other;
   and wherein at least one of said at least one first connecting member and said at least one second connecting member includes at least one curved/bent portion which is flexible in a plane perpendicular to a shock-receiving direction in which a shock is to be primarily applied to said plurality of main bodies.

2. A shook absorbing structure according to claim 1, wherein each of said at least one curved/bent portion is formed over an entire length of said at least one of said at least one first connecting member and said at least one second connecting member.

3. A shook absorbing structure according to claim 1, wherein each of said at least one curved/bent portion is formed in corresponding one of selected portions of said at least one of said at least one first connecting member and said at least one second connecting member.

4. A shock absorbing structure according to claim 1, wherein said each of said at least one connecting body further includes a third connecting member linearly extending between said adjacent ones of said main bodies and is made of synthetic resin material, said third connecting member inhibiting a relative movement of said adjacent ones of said main bodies in said direction in which said plurality of main bodies are spaced apart from each other.

5. A shook absorbing structure according to claim 1, wherein both of said at least one first connecting member and said at least one second connecting member include said at least one curved/bent portion.

6. A shook absorbing structure according to claim 1, wherein said at least one curved/bent portion is flexible in said shock-receiving direction.

7. A shook absorbing structure according to claim 1, wherein each of said at least one curved/bent portion is a curved portion which is flexible in said plane such that a radius of curvature of said curved portion is changed when said curved portion is flexed.

8. A shock absorbing structure according to claim 1, wherein each of said at least one curved/bent portion is a bent portion which is flexible in said plain such that an angle of bend of said bent portion is changed when said bent portion is flexed.

* * * * *

UNITED STATES PATENT AND TRADEMARK OFFICE
CERTIFICATE OF CORRECTION

PATENT NO. : 6,942,076 B2
DATED : September 13, 2005
INVENTOR(S) : Takane Suzuki and Kazuyuki Fukushima It is certified that error appears in the above-identified patent and that said Letters Patent is hereby corrected as shown below:

Column 17,
Line 30, please change "shook" to -- shock --.

Column 18,
Lines 1, 14, 18 and 21, please change "shook" to -- shock --.
Line 28, please change "plain" to -- plane --.

Signed and Sealed this

Sixth Day of December, 2005

JON W. DUDAS
*Director of the United States Patent and Trademark Office*